(12) United States Patent
Faucher et al.

(10) Patent No.: US 8,342,669 B2
(45) Date of Patent: Jan. 1, 2013

(54) REACTIVE INK COMPONENTS AND METHODS FOR FORMING IMAGES USING REACTIVE INKS

(75) Inventors: Santiago Faucher, Oakville (CA); Cheryl Lynn Pearce, Cambridge (CA); Peter G. Odell, Mississauga (CA); David Allen Mantell, Rochester, NY (US); Emily L. Moore, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 602 days.

(21) Appl. No.: 12/562,839

(22) Filed: Sep. 18, 2009

(65) Prior Publication Data

US 2011/0070372 A1 Mar. 24, 2011

(51) Int. Cl.
*C09D 11/00* (2006.01)
(52) U.S. Cl. .......... 347/96; 347/100; 347/102; 106/31.6
(58) Field of Classification Search ............ 347/95–100, 347/102; 106/31.13, 31.27, 31.6
See application file for complete search history.

(56) References Cited

U.S. PATENT DOCUMENTS

| | | |
|---|---|---|
| 4,251,824 A | 2/1981 | Hara et al. |
| 4,410,899 A | 10/1983 | Haruta et al. |
| 4,412,224 A | 10/1983 | Sugitani |
| 4,490,731 A | 12/1984 | Vaught |
| 4,532,530 A | 7/1985 | Hawkins |
| 4,601,777 A | 7/1986 | Hawkins et al. |
| 5,354,840 A | 10/1994 | Odell |
| 5,372,852 A | 12/1994 | Titterington et al. |
| 5,380,769 A | 1/1995 | Titterington et al. |
| 5,645,888 A | 7/1997 | Titterington et al. |
| 5,958,169 A | 9/1999 | Titterington et al. |
| 6,114,076 A | 9/2000 | Odell et al. |
| 6,352,805 B1 | 3/2002 | Taylor et al. |
| 6,547,380 B2 | 4/2003 | Smith et al. |
| 7,259,275 B2 | 8/2007 | Belelie et al. |
| 7,276,614 B2 | 10/2007 | Belelie et al. |
| 2008/0000384 A1 | 1/2008 | Belelie et al. |
| 2008/0295731 A1 | 12/2008 | Odell et al. |

(Continued)

OTHER PUBLICATIONS

Achilias and Sideridou, Kinetics of Benzoyl Peroxide/Amine Initiated Free Radical Polymerization of Dental Dimethacrylate Monomers: Experimental Modeling Studies for TEDGMA and Bis-EMA, Macromolecules, vol. 37, No. 11, 2004, pp. 4254-4265.

(Continued)

*Primary Examiner* — Matthew Luu
*Assistant Examiner* — Rut Patel
(74) *Attorney, Agent, or Firm* — Marylou J. Lavoie

(57) ABSTRACT

An ink set including at least two inks. A first ink includes an optional colorant, a first multi-functional monomer, a second multi-functional monomer that is different from the first multi-functional monomer, and a peroxide initiator comprising a thermal free radical initiator. A second ink includes an optional colorant, a first multi-functional monomer, a second multi-functional monomer that is different from the first multi-functional monomer, and an amine activator having a catalyst which catalyzes the homolytic cleavage of the thermal free-radical initiator at low temperatures into radicals. The first ink is free of the amine activator and the second ink is free of the peroxide initiator. The first multi-functional monomer and the second multi-functional monomer accelerate reaction kinetics through a Trommsdorff effect. The components are each present in an amount relative to the other that provides a) early onset of gelation that accelerates polymerization, and b) an ink viscosity that is suitable for jetting from an ink jet printer.

19 Claims, 6 Drawing Sheets

U.S. PATENT DOCUMENTS

2009/0085996 A1* 4/2009 Kasai .......................... 347/100

OTHER PUBLICATIONS

Elliott, Lovell, and Bowman, Primary Cyclization in the Polymerization of Bis-GMA and TEGDMA: a modeling approach to understanding the cure of dental resins, Dental Materials 17 (2001), pp. 221-229.

Sideridou, Achilias, and Karava, Reactivity of Benzoyl Peroxide/Amine System as an Initiator for the Free Radical Polymerization of Dental and Orthopaedic Dimetharcylate Monomers: Effect of the Amine and Monomer Structures, Macromolecules 39, 2006, pp. 2071-2080.

Achilias and Sideridou, Study of the Effect of Two BPO/Amine Initiating Systems on the Free-Radical Polymerization of MMA Used in Dental Resins and Bone Cements, J. Macromol. Sci., A39, 2002, pp. 1435-1450.

L. Horner, Zur Umsetzung von Diacylperoxyden mit tertiaren Aminen, J. Polym. Sci., vol. 18, 1955, pp. 438-439.

Feng, The Role of Amine in Vinyl Radical Polymerization, Makromol. Chem., Macromol. Symp., 63, 1992, pp. 1-18.

Moad, Rizzardo, and Solomon, The Reaction of Acyl Peroxides with 2,2,6,6-Tetramethylpiperidinyl-1-oxy, Tetrahedron Letters, vol. 22, 1981, pp. 1165-1168.

* cited by examiner

REACTIVE INK COMPONENTS AND METHODS FOR FORMING IMAGES USING REACTIVE INKS

BACKGROUND

Disclosed herein are reactive ink components and methods for forming images using the reactive inks.

Ink jetting devices are known in the art, and thus extensive description of such devices is not required herein. As described in U.S. Pat. No. 6,547,380, which is hereby incorporated by reference herein in its entirety, ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

There are at least three types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing wherein an acoustic beam exerts a radiation pressure against objects upon which it impinges. Thus, when an acoustic beam impinges on a free surface such as at the liquid/air interface of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

In a typical design of a piezoelectric ink jet device utilizing phase change inks printing directly on a substrate or on an intermediate transfer member, such as the one described in U.S. Pat. No. 5,372,852, which is hereby incorporated by reference herein in its entirety, the image is applied by jetting appropriately colored inks during four to eighteen rotations (incremental movements) of a substrate (an image receiving member or intermediate transfer member) with respect to the ink jetting head, i.e., there is a small translation of the print head with respect to the substrate in between each rotation. This approach simplifies the print head design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

Thermal ink jet processes are well known and are described, for example, in U.S. Pat. Nos. 4,601,777, 4,251,824, 4,410,899, 4,412,224 and 4,532,530, the disclosures of each of which are hereby totally incorporated herein.

Ink jet printing processes may employ inks that are solid at room temperature and liquid at elevated temperatures. Such inks may be referred to as hot melt inks or phase change inks. For example, U.S. Pat. No. 4,490,731, which is hereby incorporated by reference herein in its entirety, discloses an apparatus for dispensing solid ink for printing on a substrate such as paper. In thermal ink jet printing processes employing hot melt inks, the solid ink is melted by the heater in the printing apparatus and utilized (i.e., jetted) as a liquid in a manner similar to that of conventional thermal ink jet printing. Upon contact with the printing substrate, the molten ink solidifies rapidly, enabling the colorant to substantially remain on the surface of the substrate instead of being carried into the substrate (for example, paper) by capillary action, thereby enabling higher print density than is generally obtained with liquid inks. Advantages of a phase change ink in ink jet printing are thus elimination of potential spillage of the ink during handling, a wide range of print density and quality, minimal paper cockle or distortion, and enablement of indefinite periods of nonprinting without the danger of nozzle clogging, even without capping the nozzles.

Xerographic and ink jet print image permanence can be affected negatively in the office environment such as by common water spills, fingerprints, heat and abrasion. In order to improve print image permanence, a coating is often applied over the print. Such overcoats can be solvent or aqueous based and curable or non-curable. Curable inks have been developed to provide robust images with improved image permanence. Ultra-violet curable inks and overcoats have been developed to form extremely robust images. With this type of ink technology, the printed ink itself can be made tougher by cross-linking the ink on and optionally within the substrate (such as paper).

U.S. Pat. Nos. 7,276,614 and 7,259,275, which are each hereby totally incorporated by reference herein in their entireties, disclose ultraviolet curable compounds that are soluble in phase change ink carriers and can be incorporated into the phase change ink without adversely affecting the viscosity characteristics of the ink at desired jetting temperatures.

U.S. Patent Publication Number 20080000384, which is hereby incorporated by reference herein in its entirety, discloses a radiation curable phase change ink comprising an ink vehicle that includes at least one curable carrier, at least one gellant, at least one curable wax, and at least one photoinitiator. In a method of forming an image with the ink, the radiation curable phase change ink is melted, then jetted onto an image receiving substrate, wherein the radiation curable phase change ink forms a gel state, exposed to ultraviolet light to cure the curable components of the radiation curable phase change ink. The wax cures into the structure of the ink, thereby generating a robust image of excellent gloss.

For both curable inks and overcoats, cross-linking of the resin can be achieved by ultraviolet irradiation. However, ultra-violet curable materials can require complex and expensive ultra-violet light curing stations or expensive photoinitiators to cure or fix the images onto a substrate. Other inks, such as electron beam curable inks, can also require expensive curing stations and shielding devices.

Two part reactive cross-linking formulations based on free radical polymerization are known. However, none of these chemistries have achieved cross-linking times on the order of seconds. Artisans, one example being those who work with dental resin applications, prefer formulations that can be easily mixed and that permit some forming time prior to full cure. Fast curing formulations have not been desirable and therefore have not been developed.

U.S. Patent Publication Number 20080295731, which is hereby incorporated by reference herein in its entirety, describes a reactive ink set including three mixtures of radically polymerizable monomers. The ink set includes a first mixture including a peroxide, a second mixture including a peroxide decomposition agent, and an optional third mixture that does not include a peroxide or a peroxide decomposition agent. The first mixture and the second mixture polymerize to form a solid ink on the substrate following jetting in the liquid state.

U.S. Pat. No. 5,354,840, which is hereby incorporated by reference herein in its entirety, discloses functional-amine polyesters having at least a first residue of a first monomer, a second residue of a second monomer, and from about 0.1 to about 3.0 mole percent of a functional-amine residue of a functional amine prepared by reacting the first and second monomers and the functional amine in an inert atmosphere. The functional amine has a functional group which facilitates polymerizing the amine and the first and second monomers. The amine residue facilitates reaction of the functional-amine polyester in an organic peroxide cross-linking reaction system.

U.S. Pat. Nos. 5,380,769, 5,645,888, and 5,958,169, which are hereby incorporated by reference herein in their entireties, disclose reactive ink compositions that utilize at least two reactive components, a base ink component and a curing component, that are applied to a receiving substrate separately. The base ink component includes an ink carrier, a compatible colorant, and a cross-linkable constituent, and the curing component is a cross-linking agent. Upon exposure of the base ink component to the curing component, at least a portion of the ink is cross-linked to provide a printed image that is durable and abrasion-resistant U.S. Pat. No. 6,114,076, which is hereby incorporated by reference herein in its entirety, discloses a reactive melt mixing process for the preparation of a low fix temperature toner resin. The process includes (a) mixing a reactive base resin, an initiator, and a polyester with amine functionality, and (b) crosslinking the resulting polymer melt under high shear to form a crosslinked toner resin.

While these technologies are suitable for their intended purposes, there remains a need in large scale production and home and office printing for an improved ink system that can provide robust, scratch, and mar resistant images that are inexpensive and efficiently produced. Further, there is a need for fast curing reactive inks that can be reliably used with desired print speeds.

The appropriate components and process aspects of the each of the foregoing U.S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

An ink set is described comprising at least two inks, wherein a first ink includes an optional colorant, a first multi-functional monomer, a second multi-functional monomer that is different from the first multi-functional monomer, and a peroxide initiator comprising a thermal free radical initiator; wherein a second ink includes an optional colorant, a first multi-functional monomer, a second multi-functional monomer that is different from the first multi-functional monomer, and an amine activator comprising a catalyst which catalyzes the homolytic cleavage of the thermal free-radical initiator at low temperatures into radicals; wherein the first ink is free of the amine activator and the second ink is free of the peroxide initiator; and wherein each of the first multi-functional monomer and the second multi-functional monomer is a monomer that accelerates reaction kinetics through a Trommsdorff effect; and wherein the first multi-functional monomer, the second multi-functional monomer, the peroxide initiator, and the amine activator are each present in an amount relative to the other that provides a) early onset of gelation that accelerates polymerization, and b) an ink viscosity is suitable for jetting from an ink jet printer.

Also described is a method of forming an image with an ink set comprising at least two inks, wherein a first ink includes an optional colorant, a first multi-functional monomer, a second multi-functional monomer that is different from the first multi-functional monomer, and a peroxide initiator comprising a thermal free radical initiator; wherein a second ink includes an optional colorant, a first multi-functional monomer, a second multi-functional monomer that is different from the first multi-functional monomer, and an amine activator comprising a catalyst which catalyzes the homolytic cleavage of the thermal free-radical initiator at low temperatures into radicals; wherein the first ink is free of the amine activator and the second ink is free of the peroxide initiator; and wherein each of the first multi-functional monomer and the second multi-functional monomer is a monomer that accelerates reaction kinetics through a Trommsdorff effect; and wherein the first multi-functional monomer, the second multi-functional monomer, the peroxide initiator, and the amine activator are each present in an amount relative to the other that provides a) early onset of gelation that accelerates polymerization, and b) an ink viscosity that is suitable for jetting from an ink jet printer, the method comprising providing the ink set to an ink jet device with an ink jet print head; mixing the first and second inks before jetting, mixing the first and second inks during jetting, or mixing the first and second inks after jetting; jetting the first and second inks with the ink jet print head onto a substrate or onto an intermediate transfer member; wherein, when the first and second inks mix, the peroxide initiator and the amine activator initiate a reaction of the first and second multi-functional monomers of the first and second ink to form a hard, solid image.

Further described is a method of forming an article with the herein-described ink set, the method comprising providing the ink set to device having an orifice for ejecting the ink set; mixing the first and second inks before ejecting, mixing the first and second inks during ejecting, or mixing the first and second inks after ejecting; ejecting the first and second inks with the device into a mold; wherein, when the first and second inks mix, the peroxide initiator and the amine activator initiate a reaction of the at least one multi-functional monomer of the first and second ink to form a hard, solid article.

Further described is an ink jet system comprising an ink set comprising at least two inks, wherein a first ink includes an optional colorant, a first multi-functional monomer, a second multi-functional monomer that is different from the first multi-functional monomer, and a peroxide initiator comprising a thermal free radical initiator; wherein a second ink includes an optional colorant, a first multi-functional monomer, a second multi-functional monomer that is different from the first multi-functional monomer, and an amine activator comprising a catalyst which catalyzes the homolytic cleavage of the thermal free-radical initiator at low temperatures into radicals; wherein the first ink is free of the amine activator and the second ink is free of the peroxide initiator; wherein each of the first multi-functional monomer and the second multi-functional monomer is a monomer that accelerates reaction kinetics through a Trommsdorff effect; wherein the first multi-functional monomer, the second multi-functional monomer, the peroxide initiator, and the amine activator are each present in an amount relative to the other that provides a) early onset of gelation that accelerates polymerization, and b) a final composition viscosity after combining and reactive the first ink and the second ink that is suitable for jetting from an ink jet printer; and an ink jet device including at least two channels, wherein the first ink is located in a first channel and the second ink is located in a second channel, wherein the first and second inks are jettable from an ink jet print head of the ink jet device, and wherein the first and second inks combine inside or outside of the ink jet device.

DETAILED DESCRIPTION

Figure 1:
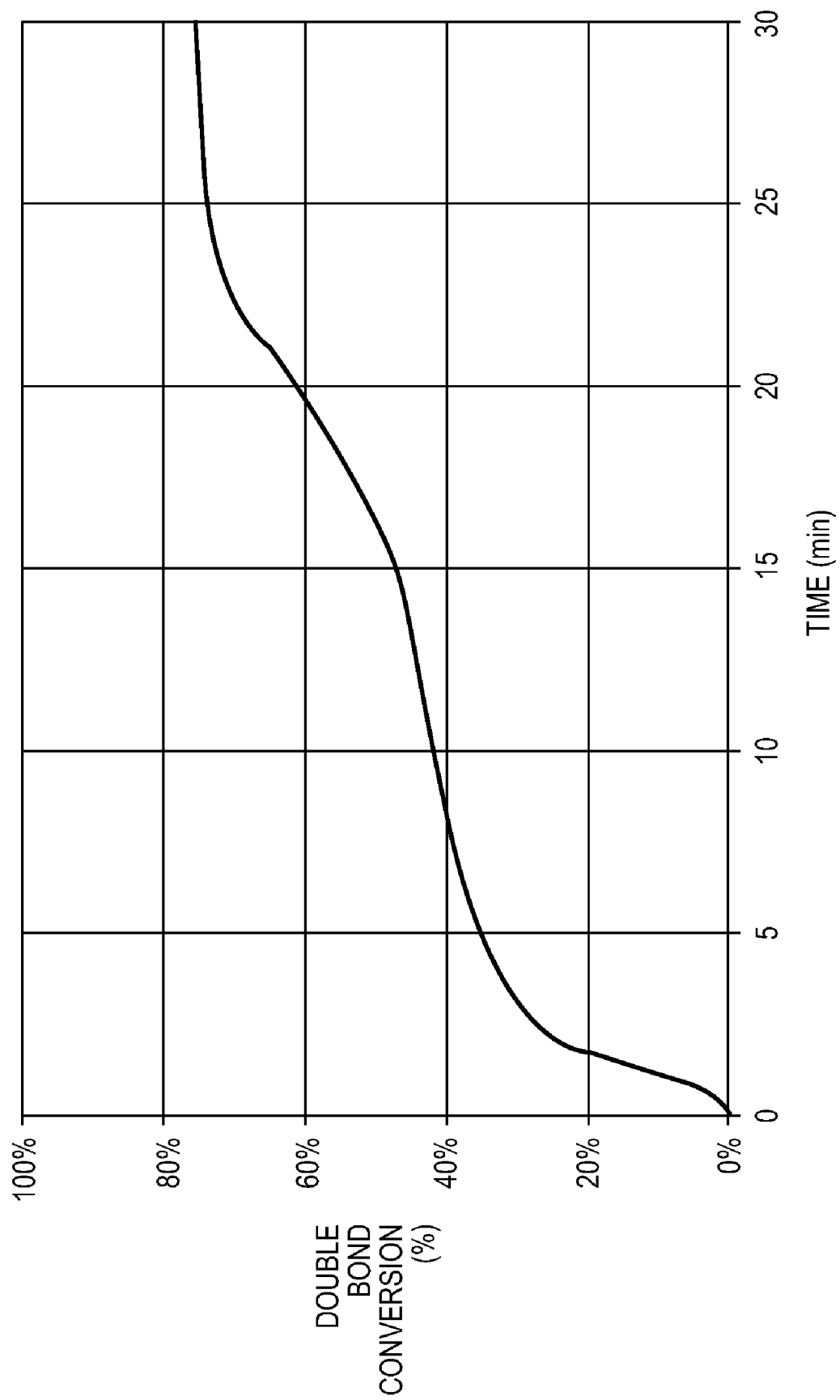
FIG. 1 is a graph showing double bond conversion versus reaction time for Comparative Example 1.

An ink set is described comprising at least two inks, wherein a first ink includes an optional colorant, a first multi-functional monomer, a second multi-functional monomer that is different from the first multi-functional monomer, and a peroxide initiator comprising a thermal free radical initiator; wherein a second ink includes an optional colorant, a first multi-functional monomer, a second multi-functional monomer that is different from the first multi-functional monomer, and an amine activator comprising a catalyst which catalyzes the homolytic cleavage of the thermal free-radical initiator at low temperatures into radicals; wherein the first ink is free of the amine activator and the second ink is free of the peroxide initiator; and wherein each of the first multi-functional monomer and the second multi-functional monomer is a monomer that accelerates reaction kinetics through a Trommsdorff effect; and wherein the first multi-functional monomer, the second multi-functional monomer, the peroxide initiator, and the amine activator are each present in an amount relative to the other that provides a) early onset of gelation that accelerates polymerization, and b) a final composition viscosity after combining and reactive the first ink and the second ink that is suitable for jetting from an ink jet printer. Viscosity suitable for jetting form an ink jet printer is typically about 10 centipoise. In embodiments, the multi-functional monomer is a multi-vinyl monomer, the peroxide initiator is a peroxide, in a specific embodiment benzoyl peroxide, and the amine activator is an amine, in a specific embodiment N,N-dimethyl-p-toluidine. The ink sets and methods herein provide a fast curing formulation based on free radical chemistry that cures in seconds and that is suitable for a variety of applications including reactive overcoats, reactive ink jet printing, reaction injection molding, adhesives, and micro-particle synthesis and encapsulation. The ink sets and methods are easily mixed and handled in printing devices wherein the built-in microfluidic devices in the print-head can be tailored to achieve desired mixing and residence times.

The reactive ink components include two or more inks that mix or combine to initiate a rapid, predictable and controllable free radical polymerization reaction. While not wishing to be bound by theory, it is believed that by combining a highly functionalized monomer system that accelerates the reaction kinetics through the Trommsdorff effect and a fast initiation system based on the catalyzed decomposition of a peroxide initiator (e.g., a peroxide) by an amine activator (e.g., an amine catalyst), the present ink sets can provide unprecedented reaction rates for cross-linking free radical polymerizations.

The Trommsdorff effect, also known as autoacceleration, the gel effect or the Norrish-Smith effect, can occur in free radical polymerization reactions when there is a high concentration of monomer. In solutions having high monomer concentration, the viscosity of the reaction mixture becomes high as the polymer chains form. This reduces the mobility of the polymer chains thereby reducing the ability of the chain ends to react with one another which reduces the rate of chain termination. The mobility of the smaller monomers, however, is not significantly affected by the increase in viscosity, and so the monomers continue to react with the polymer chain, causing the polymer to grow rapidly without termination. This phenomenon leads to a high molecular weight material and to accelerated polymerization rates.

In the present ink set and method, fast polymerization kinetics are achieved by combining an oxidation reduction initiation reaction scheme that leads to a high concentration of free radicals with a multi-functional monomer that forces the early onset of the Trommsdorff effect thus extending the life of the free radicals and further accelerating reaction rates. For example, a multi-vinyl monomer such as dipentaerythritol pentaacrylate having the structure (I)

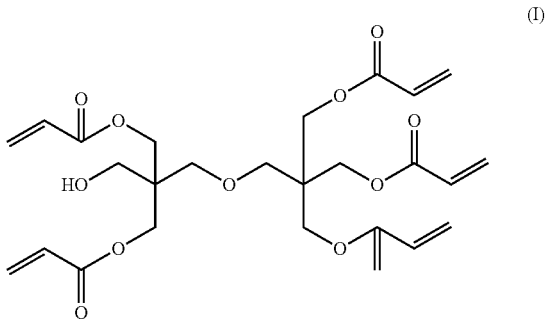 [SMILES: C=CC(=C)OCC(COCC(CO)(COC(=O)C=C)COC(=O)C=C)(COC(=O)C=C)COC(=O)C=C]

can be used to prepare two monomer compositions, for example two ink sets, the first monomer composition being the first ink and the second monomer composition being the second ink. The first monomer composition comprises the multi-vinyl monomer (I) and a thermal free-radical initiator that typically homolytically cleaves at high temperatures, such as about 100° C. The second monomer composition comprises the multi-vinyl monomer (I) and a catalyst such as an amine. When the first monomer composition and the second monomer composition are combined, the amine catalyzes the homolytic cleavage of the thermal free-radical initiator at low temperatures into radicals, low temperatures meaning, for example, less than about 40° C. An illustrative reaction comprising the formation of primary radicals from the reaction of an amine catalyst (N,N-dimethyl-p-toluidine) and a thermal free-radical initiator (benzoyl peroxide) is as follows:

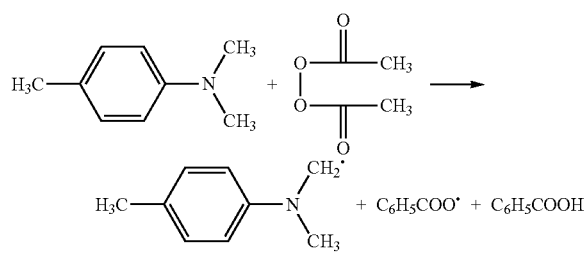

The method enables control of the reaction onset and enables reactions to be undertaken at lower temperatures than typically practiced with thermal free radical initiators. In embodiments, the reaction is undertaken at a temperature of from about 10° C. to about 50° C., or less than about 40° C. The lower reaction temperatures enable lower printer drum temperature, thereby reducing energy consumption per print.

Upon mixing of the first ink and the second ink, the peroxide initiator and amine activator react with each other to provide early onset of gelation and accelerate polymerization. As used herein, early onset of gelation means that a single peak radical concentration versus time, or double bond conversion rate versus time, or polymerization rate versus time, is observed at the onset of monomer conversion to polymer. In other words, early onset of gelation is defined as reaction kinetics that have a single peak in the polymerization rate as a function of time for the production of a solid material from liquid monomer inks. In contrast, a late onset of gelation, or the Trommsdorff effect, is defined as a polymerization where the onset of monomer conversion does not coincide with the onset of the Trommsdorff effect, or gelation. That is, two peaks in radical concentration versus time, or double bond conversion rate versus time, or polymerization rate versus time is observed. As a result of early onset of gelation there is therefore a higher concentration of radicals created early on in the polymerization and therefore a higher polymerization rate or curing rate. Such early onset of gelation can be achieved by formulating inks such that the monomers are in high concentration (bulk polymerization conditions) and the monomers are multifunctional leading to the early onset of gelation.

Thus, the first ink and the second ink can be stored or kept separately to prevent premature reacting between the peroxide initiator and amine activator. The first ink and the second ink of the ink set can be loaded into two separate delivery vehicles, such as ink jet print heads, spray bottles, nebulizers, syringes, adhesive dispensers, and applied in equal quantities (though not required to be equal quantities) in the presence or absence of an inert atmosphere ($N_2$ or Ar) to a substrate, such as glass or paper, or dispensed into a mold. Depending on the reaction volume, the mixture will cure instantly in the presence or absence of an external heat source and in either air or under an inert atmosphere.

In embodiments, the ink set provides substantially complete polymerization of the first and second multi-functional monomers in from about 0.1 to about 60 seconds after combination of the first ink and the second ink. When mixed in large quantities, for example greater than about 0.5 grams of each of the first ink and the second ink, the mixture cures instantly, that is, in less than about 2 seconds, in an inert atmosphere at 50° C. When the reaction volume or thickness is reduced, such as to that typical of overcoats or print droplets, higher temperatures such as from about 60° C. to about 100° C., and an inert atmosphere ($N_2$ or Ar) can be used to maintain fast cures of less than about 2 seconds.

The method provides polymerization rates that are one order of magnitude faster than those reported in the literature for other free radical polymerizations of vinyl monomers. See for example, Achilias, D. S.; Sideridou, I. D., Macromolecules, 2004, 37, 4254-4265; Elliott, J. E.; Lovell, L. G.; Bowman, C. N., Dental Materials, 2001, 17, 221-229; Sideridou, I. D., Achilias, D. S.; Karava, O., Macromolecules, 2006, 39, 2072-2080, and Achilias, D. S., Sideridou, I. D., J. Macromol. Sci., 2002, A39, 1435-1450. The ink sets and methods provide fast reaction kinetics and enable a variety of applications including overcoats, reactive inks, particle synthesis and encapsulation, adhesives, and reaction injection molding. In embodiments herein, fast polymerization means the ink crosslinks to a solid material in from about 0.01 to about 60 seconds after combination of the first ink and the second ink.

Suitable multi-functional monomers include monomers that accelerate reaction kinetics by causing early crosslinking of the reaction media. The first ink and the second ink each contain a first multi-functional monomer and a second multi-functional monomer that is different from the first multi-functional monomer.

Optionally, the first ink and/or the second ink can also include other monomers or binder materials provided the other materials are provided in an amount that does not adversely affect the reaction kinetics. For example, a small concentration, such as less than about 10%, of an acrylate, as opposed to a diacrylate or multi-functional acrylate, can optionally be included.

In embodiments, the multi-functional monomer is a multi-vinyl monomer having from at least about 2 to about 5 vinyl moieties. Examples of suitable multi-functional monomers include monomers selected from the group consisting of pentaerythritol tetraacrylate, pentaerythritol tetramethacrylate, 1,2-ethylene glycol diacrylate, 1,2-ethylene glycol dimethacrylate, 1,6-hexanediol diacrylate, 1,6-hexanediol dimethacrylate, 1,12-dodecanol diacrylate, 1,12-dodecanol dimethacrylate, tris(2-hydroxy ethyl) isocyanurate triacrylate, propoxylated neopentyl glycol diacrylate, hexanediol diacrylate, tripropylene glycol diacrylate, dipropylene glycol diacrylate, ethoxylated bisphenol A diacrylate, ethoxylated bisphenol A dimethacrylate, alkoxylated hexanediol diacrylate, alkoxylated cyclohexane dimethanol diacrylate, polyethylene glycol diacrylate, polyethylene glycol dimethacrylate, tris(2-hydroxy ethyl)isocyanurate triacrylate, trifunctional acrylate ester, amine modified polyether acrylate, trimethylolpropane triacrylate, glycerol propoxylate triacrylate, dipentaerythritol pentaacrylate, dipentaerythritol hexaacrylate, ethoxylated pentaerythritol tetraacrylate, and mixtures and combinations thereof. In a specific embodiment, the first multi-functional monomer is propoxylated neopentylglycol diacrylate and the second multi-functional monomer is dipentaerythritol pentacrylate. In another specific embodiment, the first multi-functional monomer of the first ink is propoxylated neopentylglycol diacrylate and the second multi-functional monomer of the first ink is dipentaerythritol pentacrylate, the first multi-functional monomer of the second ink is propoxylated neopentylglycol diacrylate and the second multi-functional monomer of the second ink is dipentaerythritol pentacrylate, the peroxide initiator is benzoyl peroxide, and the amine activator is N,N-dimethyl-p-toluidine.

Components are provided herein in amounts relative to one another which cause a single early peak in the double bond conversion rate that incorporates the onset of bond conversion and autoacceleration of the polymerization through the Trommsdorff effect in a reaction that forms a solid crosslinked polymeric mass. In embodiments, the first multi-functional monomer is present in the first ink in an amount of from about 85 to about 95 percent, the second multi-functional monomer is present in the first ink in an amount of from about 15 to about 5 percent, the peroxide initiator is present in the first ink in an amount of from about 1 to about 5 percent, wherein percent is percent by weight based upon the total weight of the first ink; and the first multi-functional monomer is present in the second ink in an amount of from about 85 to about 95 percent, the second multi-functional monomer is present in the second ink in an amount of from about 15 to about 5 percent, the amine activator is present in the second ink in an amount of from about 1 to about 5 percent, wherein percent is percent by weight based upon the total weight of the second ink.

The first ink, the second ink, and the optional third ink refer to individual inks that are un-reacted The inks may be mixed to form an ink set which has not initiated the free-radical polymerization reaction of the multi-functional monomers in the inks. The free radical polymerization reaction (or redox reaction) of the multi-functional monomer can be initiated by a promotion of the peroxide initiator by the amine activator in the second ink. The initiation by the peroxide initiator can be referred to as the redox reaction initiation and can polymerize the multi-functional monomers of the ink sets to form the hard, solid ink. The hard, solid ink can form images on a substrate which images can be robust and can withstand stress from scratching and marring. In embodiments, the hard solid material can be an ink image, a colored ink image, an overcoat, or an undercoat.

The first ink of the ink set can include an optional colorant, at least one multi-functional monomer, an optional gellant, and a peroxide initiator comprising a thermal free radical initiator. The second ink of the ink set can include an optional colorant, at least one multi-functional monomer, an optional gellant, and an amine activator comprising a catalyst which catalyzes the homolytic cleavage of the thermal free-radical initiator at low temperatures into radicals. The first ink should be free of the amine activator and the second ink should be free of the peroxide initiator.

The ink set can include an optional third ink that does not include the peroxide initiator or the amine activator. The optional third ink of the ink set can include an optional inhibitor, an optional purge ink, a binder or ink vehicle, an optional colorant, and an optional gellant. The binder or ink vehicle for the optional third ink can include the multi-functional monomers described above for the first ink and second ink. The binder or ink vehicle for the third ink can also include monomer compounds such as acrylate, methacrylate, alkene, vinyl ether, allylic ether, and mixtures and combinations thereof. Specific examples of monomers include isobornyl acrylate, isobornyl methacrylate, lauryl acrylate, lauryl methacrylate, isodecylacrylate, isodecylmethacrylate, caprolactone acrylate, 2-phenoxyethyl acrylate, isooctylacrylate, isooctylmethacrylate, butyl acrylate, styrene, isoprene, alkoxylated lauryl acrylate, ethoxylated nonyl phenol acrylate, ethoxylated nonyl phenol methacrylate, ethoxylated hydroxyethyl methacrylate, methoxy polyethylene glycol monoacrylate, methoxy polyethylene glycol monomethacrylate, tetrahydrofurfuryl methacrylate, tetrahydrofurfuryl methacrylate, and mixtures and combinations thereof. Further, the bind or ink vehicle for the third ink may include tricyclodecane dimethanol diacrylate, lauryl diacrylate, 1,4-butanediol-diacrylate, 1,3-butylene glycol diacrylate, trimethylolpropane triacrylate, ethoxylated lauryl acrylate, polyethylene glycol diacrylate, glyceryl triacrylate, triacrylate, and mixtures and combinations thereof.

The binder or ink vehicle can be present in the optional third ink in any desired or effective amount, such as from about 0.1 to about 98 percent, from about 50 to about 98 percent, or from about 70 to about 95 percent, based upon the total weight of the third ink.

The inks may be mixed to form the ink system within the ink jetting device. In such embodiments, the redox reaction and the polymerization of the vinyl monomer may begin to form the hard, solid ink. The ink system prior to polymerization may be jetted from the ink jet head. After combination or mixing of the inks and polymerization of the vinyl monomer of the first and second inks, residual radicals or compounds may remain in the ink jetting device. The optional third ink may be used for purging the compounds and radicals from the device. The optional third ink prevents the compounds and radicals from polymerizing and forming hard, solid ink that may clog the ink jetting device. In embodiments, a separate purge ink may pass through the ink jet head to remove the residual radicals or compounds from the ink jetting device prior to the subsequent jetting of additional inks. In further embodiments, the first or second ink may pass through the ink jet head to remove and purge the residual radicals or compounds there from.

The peroxide initiator (e.g., peroxide) and the amine activator (e.g., amine) may be selected to be stable at jetting temperatures, for example to about 80° C., such as from about 25° C. to about 50° C. At least one of the first, second and optional third inks may be mixed or combined before, during or after jetting the inks onto a substrate to form an image or coating.

In embodiments, the first, second or optional third inks may be mixed or combined inside the ink jetting device to form the ink system before the ink system is jetted onto an intermediate transfer member or final substrate, or deposited into a mold.

In further embodiments, the inks may be mixed or combined anywhere between exiting the ink jet head and the substrate, that is, anywhere in flight. After combination of the inks between the ink jetting device and the substrate, the droplets of the inks may begin to react, that is polymerization of the vinyl monomers may begin and momentum of the droplets may carry the droplets to a desired location on the substrate. As a result, the ink system is formed between the ink jetting device and the substrate or outside the ink jetting device. Mixing or combining the inks during transferring involves ejecting droplets of the inks so that the droplets of the inks collide and mix in flight between the ink jetting device and the substrate. The ink jet print head may be configured to separately jet each of the inks so that the inks combine upon being jetted. While in flight, the polymerization of the vinyl monomers in the inks may form the hard, solid ink before the droplets collide with the substrate.

In further embodiments, the redox reaction and the polymerization may not begin until the inks have contacted or been transferred to the final substrate. For example, the droplets may not collide or mix until the droplets contact or are positioned on the final substrate. The inks may be ejected from the ink jetting device to a desired location on the substrate, and the ink system may be formed thereon. As a result, the redox reaction may be initiated by the inks on the substrate to form the hard, solid ink thereon.

By mixing the inks outside of the ink jet print head, no residual compounds or radicals are left within the ink jetting device. As a result, purging of the residual radicals or compounds from the ink jetting device may not be required. Thus the inks or ink jetting device may not be required to have a purge ink.

An ink jetting device suitable for use herein may have different channels or reservoirs for storing and maintaining separation of the first, second, and optional third inks. At least one of the inks may be stored separately to prevent the redox reaction between any of the inks from occurring prematurely. The ink jetting device may have channels or reservoirs for each of the colors, such as black, cyan, magenta and yellow.

At least one ink jet head of the device may eject or print the droplets of the ink system. At least one print head may include multiple arrays of ejectors. The array of ejectors may mix or combine the inks and may provide raid mixing of the inks. In embodiments, the ink jetting device may be a microreactor system to provide rapid mixing of the inks so that the mixing occurs faster than with a conventional batch reactor.

The peroxide initiator can be provided for efficient and substantial promotion of the redox reaction by the amine activator of the second ink. Use of one or more organic peroxides as the peroxide initiator can provide a more efficient amine promotion for the redox reaction as compared with non-organic peroxides.

Thus, the peroxide initiator of the first ink can be a peroxide which upon activation will act as an initiator. Suitable peroxides or initiators for the peroxide initiator of the first ink can be present in any desired or effective amount, such as from about 1 to about 5 percent by weight based upon the total weight of the first ink. In specific embodiments, the peroxide initiator can be a peroxide such as an organic peroxide, t-butyl hydroperoxide, or cumene hydroperoxide. Further examples of suitable peroxides include hydroperoxides, such as t-butyl hydroperoxide, 2,5-dihydroperoxy-2,5-dimethylhexane, cumene hydroperoxide, and t-amyl hydroperoxide, acyl peroxides, such as benzoyl peroxide, alkyl peroxides, such as dicumyl peroxide, 2,5-dimethyl-2,5-di(t-butylperoxy)hexane, t-butyl-α-cumyl peroxide, α-α-bis(t-butylperoxy)diisopropyl benzene, di-t-butyl peroxide, t-amyl peroxide, and 2,5-dimethyl-2,5-di(t-butylperoxy)hexyne-3, peroxyesters, such as t-amylperoxyacetate, t-butylperoxybenzoate, t-amylperoxybenzoate, t-butylperoxyacetate, OO-t-butyl-O-(2-ethylhexyl)monoperoxycarbonate, and OO-t-amyl-O-(2-ethyl hexyl)monoperoxycarbonate, OO-t-butyl-O-isopropylmonoperoxycarbonate, and alkyl peroxyketals, such as 2,2-di(t-amylperoxy)propane, n-butyl-4,4-bis(t-butylperoxy) valerate, 1,1-di(t-butylperoxy)-3,3,5-trimethylcyclohexane, 1,1-di(t-butyl)peroxycyclohexane, 1,1-di(t-amylperoxy)cyclohexane, 2,2-di(t-butylperoxy)butane, ethyl 3,3-di(t-butylperoxy)butyrate ethyl 3,3-di(t-amylperoxy)butyrate, and mixtures and combinations thereof.

The amine activator which is present in the second ink of the ink set can be any suitable or effective reactive component that catalyzes the homolytic cleavage of the thermal free-radical initiator at low temperatures into radicals in the first ink thereby causing it to act as an initiator. The amine activator can be present in the second ink in any desired or effective amount such as from about 1 to about 5 percent by weight based upon the total weight of the second ink. In embodiments, the amine activator can be an amine. Further, the amine activator can be N,N-dimethyl-p-toluidine, N,N-dimethylaniline, N-(2-hydroxyethyl)-N'-methyl-p-toluidine, N,N-di(2-hydroxypropyl)p-toluidine, N-(2-hydroxyethyl)-N-methylaniline, N,N-di(2-hydroxypropyl)-p-toluidine, ethyl-p-(dimethylamino)benzoate, 2-ethylhexyl-p-(dimethylamino)benzoate, a functional-amine polyester polymer such as described in U.S. Pat. No. 5,354,840, such as copoly[(4,4'-isopropylidenebisphenyl bispropanol bisether) N-phenyldiethanolamine/fumaric acid], copoly[(4,4'-isopropylidenebisphenyl bispropanolbisether) 2,6-dimethanol pyridine/adipic acid], polymerizable amines, such as dimethlaminoethyl methacrylate, 2-hydroxy-3-dimethylaminopropyl methacrylate, 2-hydroxy-3-diethylaminopropyl methacrylate, N-acryl-N'-methylpiperazine, N-methacrylyl-N'-methylpiperazine, N—(N'-methylene-morpholino) acrylamide, N—(N∝-methylene-morpholino) methacrylamide, N—(N',N'-dimethylaminophenyl) acrylamide, N—(N',N'-dimethylaminophenyl) methacrylamide, 4-dimethylaminobenzyl methacrylate, N,N-dimethyl-p-toluidine, N,N-di(methacryloyloxy-1,2-propyl)-p-toluidine, N-methacryloyloxy-1,2-ethyl-N-methyl aniline, and mixtures and combinations thereof.

The first ink, the second ink, and the optional third ink of the ink set may each optionally contain one or more colorants. The optional colorants may be present in any desired or effective amount. For example, if present in the first ink, the optional colorant can be present in an amount of from about 0.5 to about 20 percent, or from about 1 to about 6 percent based upon the total weight of the first ink. Similarly, if present in the second or third ink, the optional colorant can be present in similar amounts. In embodiments, at least one of the inks may contain a colorant while at least one of the inks may be clear or transparent.

Examples of optional colorants that can be included in the first ink, the second ink, or the optional third ink include pigments, dyes, mixtures of pigments and dyes, mixtures of pigments, mixtures of dyes, and mixtures and combinations thereof. Any dye or pigment may be selected, provided it is capable of being dispersed or dissolved in the ink and is compatible with the other ink components.

Examples of suitable pigments include, for example, Paliogen Violet 5100 (BASF); Paliogen Violet 5890 (BASF); Heliogen Green L8730 (BASF); Lithol Scarlet D3700 (BASF); SUNFAST® Blue 15:4 (Sun Chemical 249-0592); HOSTAPERM Blue B2G-D (Clariant); Permanent Red P-F7RK; HOSTAPERM Violet BL (Clariant); Lithol Scarlet 4440 (BASF); Bon Red C (Dominion Color Company); Oracet Pink RF (Ciba); Paliogen Red 3871 K (BASF); SUNFAST® Blue 15:3 (Sun Chemical 249-1284); Paliogen Red 3340 (BASF); SUNFAST® Carbazole Violet 23 (Sun Chemical 246-1670); Lithol Fast Scarlet L4300 (BASF); Sunbrite Yellow 17 (Sun Chemical 275-0023); Heliogen Blue L6900, L7020 (BASF); Sunbrite Yellow 74 (Sun Chemical 272-0558); SPECTRA PAC® C Orange 16 (Sun Chemical 276-3016); Heliogen Blue K6902, K6910 (BASF); SUNFAST® Magenta 122 (Sun Chemical 228-0013); Heliogen Blue D6840, D7080 (BASF); Sudan Blue OS (BASF); Neopen Blue FF4012 (BASF); PV Fast Blue B2GO1 (Clariant); Irgalite Blue BCA (Ciba); Paliogen Blue 6470 (BASF); Sudan Orange G (Aldrich); Sudan Orange 220 (BASF); Paliogen Orange 3040 (BASF); Paliogen Yellow 152, 1560 (BASF); Lithol Fast Yellow 0991 K (BASF); Paliotol Yellow 1840 (BASF); Novoperm Yellow FGL (Clariant); Lumogen Yellow D0790 (BASF); Suco-Yellow L1250 (BASF); Suco-Yellow D1355 (BASF); Suco Fast Yellow D1 355, D1 351 (BASF); Hostaperm Pink E 02 (Clariant); Hansa Brilliant Yellow 5GX03 (Clariant); Permanent Yellow GRL 02 (Clariant); Permanent Rubine L6B 05 (Clariant); Fanal Pink D4830 (BASF); Cinquasia Magenta (Du Pont), Paliogen Black L0084 (BASF); Pigment Black K801 (BASF); and carbon blacks such as REGAL 330™ (Cabot), Carbon Black 5250, Carbon Black 5750 (Columbia Chemical), mixtures and combinations thereof and the like.

Examples of suitable dyes include Usharect Blue 86 (Direct Blue 86), available from Ushanti Color; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF Clariant; Carta Blue 2GL, available from Clariant; and the like.

In embodiments, solvent dyes can be used. Example solvent dyes include spirit soluble dyes such as Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF), Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 260501] (BASF), mixtures and combinations thereof and the like.

Two or more of the inks in the ink set can combine and initiate of reaction to transform into a hard, solid ink to form a visible image, a clear ink coating, or a hard, solid object such as a molded device, among other applications. If the two or more inks combine to form a visible image, at least one ink of the ink set should include a colorant. If the two or more inks combine to form a clear ink coating, such as an overcoat, the inks should not contain a colorant. If the two or more inks combine to form an undercoat, the inks may optional contain a colorant.

The ink system may further include known optional additives to take advantage of the known functionality associated with such additives. Such additives may include, for example, viscosity modifiers, antioxidants, UV absorbers, gellants, defoamers, slip and leveling agents, pigment dispersants, surfactants, and the like, as well as mixtures and combinations thereof.

Examples of suitable viscosity modifiers include aliphatic ketones, such as stearone, and the like. Further examples of suitable viscosity modifiers include 2-hydroxybenzyl alcohol, 4-hydroxybenzyl alcohol, 4-nitrobenzyl alcohol, 4-hydroxy-3-methoxy benzyl alcohol, 3-methoxy-4-nitrobenzyl alcohol, 2-amino-5-chlorobenzyl alcohol, 2-amino-5-methylbenzyl alcohol, 3-amino-2-methylbenzyl alcohol, 3-amino-4-methyl benzyl alcohol, 2(2-(aminomethyl)phenylthio)benzyl alcohol, 2,4,6-trimethylbenzyl alcohol, 2-amino-2-ethyl-1,3-propanediol, 2-amino-1-phenyl-1,3-propanediol, 2,2-dimethyl-1-phenyl-1,3-propanediol, 2-bromo-2-nitro-1,3-propanediol, 3-tert-butylamino-1,2-propanediol, 1,1-diphenyl-1,2-propanediol, 1,4-dibromo-2,3-butanediol, 2,3-dibromo-1,4-butanediol, 2,3-dibromo-2-butene-1,4-diol, 1,1,2-triphenyl-1,2-ethanediol, 2-naphthalenemethanol, 2-methoxy-1-naphthalenemethanol, decafluoro benzhydrol, 2-methylbenzhydrol, 1-benzene ethanol, 4,4'-isopropylidene bis(2-(2,6-dibromo phenoxy) ethanol), 2,2'-(1,4-phenylenedioxy)diethanol, 2,2-bis(hydroxymethyl)-2,2',2"-nitrolotriethanol, di(trimethylol-propane), 2,amino-3-phenyl-1-propanol, tricyclohexylmethanol, tris(hydroxymethyl)aminomethane succinate, 4,4'-trimethylene bis(1-piperidine ethanol), N-methyl glucamine, xylitol, or mixtures and combinations thereof. When present, the optional viscosity modifier is present in the first, second, or optional third ink in any desired or effective amount, such as from about 30 to about 55 percent or from about 35 to about 50 percent based upon the total weight of the ink.

Optional antioxidants in the ink may protect the images from oxidation and also may protect the ink components from oxidation while existing as a heated melt in the ink reservoir. Examples of suitable antioxidants include N,N'-hexamethylene bis(3,5-di-tert-butyl-4-hydroxy hydrocinnamamide) (IRGANOX® 1098, available from Ciba-Geigy Corporation), 2,2-bis(4-(2-(3,5-di-tert-butyl-4-hydroxyhydrocinnamoyloxy))ethoxyphenyl)propane (TOPANOL-205®, available from ICI America Corporation), tris(4-tert-butyl-3-hydroxy-2,6-dimethyl benzyl)isocyanurate (CYANOX® 1790, 41,322-4, LTDP, Aldrich D12,840-6), 2,2'-ethylidene bis(4,6-di-tert-butylphenyl)fluoro phosphonite (ETHANOX-398®, available from Ethyl Corporation), tetrakis(2,4-di-tert-butylphenyl)-4,4'-biphenyl diphosphonite (ALDRICH 46,852-5; hardness value 90), pentaerythritol tetrastearate (TCI America #PO739), tributylammonium hypophosphite (Aldrich 42,009-3), 2,6-di-tert-butyl-4-methoxyphenol (Aldrich 25,106-2), 2,4-di-tert-butyl-6-(4-methoxybenzyl)phenol (Aldrich 23,008-1), 4-bromo-2,6-dimethylphenol (Aldrich 34,951-8), 4-bromo-3,5-didimethylphenol (Aldrich B6,420-2), 4-bromo-2-nitrophenol (Aldrich 30,987-7), 4-(diethyl aminomethyl)-2,5-dimethylphenol (Aldrich 14,668-4), 3-dimethylaminophenol (Aldrich D14,400-2), 2-amino-4-tert-amylphenol (Aldrich 41,258-9), 2,6-bis(hydroxymethyl)-p-cresol (Aldrich 22,752-8), 2,2'-methylenediphenol (Aldrich B4,680-8), 5-(diethylamino)-2-nitrosophenol (Aldrich 26,951-4), 2,6-dichloro-4-fluorophenol (Aldrich 28,435-1), 2,6-dibromo fluoro phenol (Aldrich 26,003-7), α-trifluoro-o-creso-1 (Aldrich 21,979-7), 2-bromo-4-fluorophenol (Aldrich 30,246-5), 4-fluorophenol (Aldrich F1,320-7), 4-chlorophenyl-2-chloro-1,1,2-tri-fluoroethyl sulfone (Aldrich 13,823-1), 3,4-difluoro phenylacetic acid (Aldrich 29,043-2), 3-fluorophenylacetic acid (Aldrich 24,804-5), 3,5-difluoro phenylacetic acid (Aldrich 29,044-0), 2-fluorophenylacetic acid (Aldrich 20,894-9), 2,5-bis(trifluoromethyl) benzoic acid (Aldrich 32,527-9), ethyl-2-(4-(4-(trifluoromethyl)phenoxy)phenoxy)propionate (Aldrich 25,074-0), tetrakis(2,4-di-tert-butyl phenyl)-4,4'-biphenyl diphosphonite (Aldrich 46,852-5), 4-tert-amyl phenol (Aldrich 15,384-2), 3-(2H-benzotriazol-2-yl)-4-hydroxy phenethyl alcohol (Aldrich 43,071-4), NAUGARD® 76, NAUGARD® 445, NAUGARD® 512, and NAUGARD® 524 (commercially available from Crompton Corporation, Middlebury, Conn.), and the like, as well as mixtures and combinations thereof. The antioxidant, when present, may be present in the inks in any desired or effective amount, such as from about 0.25 percent to about 10 percent by weight of the inks or from about 1 percent to about 5 percent by weight of the inks.

The optional antioxidants may include an antioxidant stabilizer to protect the images from oxidation and may also protect the ink components from oxidation. Specific examples of suitable antioxidant stabilizers include NAUGARD® 524, NAUGARD® 635, NAUGARD® A, NAUGARD® 1-403, NAUGARD® 959, NAUGARD® 76, NAUGARD® 445, and NAUGARD® 512 commercially available from Crompton Corporation, and mixtures and combinations thereof.

The inks can also optionally contain a UV absorber. The optional UV absorbers primarily protect the generated images from UV degradation. Specific examples of suitable UV absorbers include 2-bromo-2',4-dimethoxyacetophenone (Aldrich 19,948-6), 2-bromo-2',5'-dimethoxyacetophenone (Aldrich 10,458-2), 2-bromo-3'-nitroacetophenone (Aldrich 34,421-4), 2-bromo-4'-nitroacetophenone (Aldrich 24,561-5), 3',5'-diacetoxyacetophenone (Aldrich 11,738-2), 2-phenylsulfonyl acetophenone (Aldrich 34,150-3), 3'-aminoacetophenone (Aldrich 13,935-1), 4'-aminoacetophenone (Aldrich A3,800-2), 1H-benzotriazole-1-acetonitrile (Aldrich 46,752-9), 2-(2H-benzotriazol-2-yl)-4,6-di-tert-pentylphenol (Aldrich 42,274-6), 1,1-(1,2-ethane-diyl)bis(3,3,5,5-tetramethylpiperazinone) (commercially available from Goodrich Chemicals), 2,2,4-trimethyl-1,2-hydroquinoline (commercially available from Mobay Chemical), 2-(4-benzoyl-3-hydroxy phenoxy)ethylacrylate, 2-dodecyl-N-(1,2,2,6,6-pentamethyl-4-piperidinyl)succinimide (commercially available from Aldrich Chemical Co., Milwaukee, Wis.), 2,2,6,6-tetramethyl-4-piperidinyl/β-tetramethyl-3,9-(2,4,8,10-tetraoxo spiro(5,5)-undecane) diethyl-1,2,3,4-butane tetracarboxylate (commercially available from Fairmount), N-(p-ethoxycarbonylphenyl)-N'-ethyl-N'-phenylformadine (commercially available from Givaudan), 6-ethoxy-1,2-dihydro-2,2,4-trimethylquinoline (commercially available from Monsanto Chemicals), 2,4,6-tris-(N-1,4-dimethylpentyl-4-phenylenediamino)-1,3,5-triazine (commercially available from Uniroyal), 2-dodecyl-N-(2,2,6,6-tetrame-thyl-4-piperidinyl) succinimide (commercially available from Aldrich Chemical Co.), N-(1-acetyl-2,2,6,6-tetramethyl-4-piperidinyl)-2-dodecyl succinimide (commercially available from Aldrich Chemical Co.), (1,2,2,6,6-pentamethyl-4-piperidinyl/β-tetramethyl-3,9-(2,4,8,10-tetra oxo-spiro-(5,5)undecane)diethyl)-1,2,3,4-butane tetracarboxylate (commercially available from Fairmount), (2,2,6,6-tetramethyl-4-piperidinyl)-1,2,3,4-butane tetracarboxylate (commercially available from Fairmount), nickel dibutyl dithio carbamate (commercially available as UV-Chek® AM-105 from Ferro), -amino-2',5-dichlorobenzophenone (Aldrich 10,515-5), 2'-amino-4',5'-dimethoxyacetophenone (Aldrich 32,922-3), 2-benzyl-2-(dimethylamino)-4'-morpholino butyrophenone (Aldrich 40,564-7), 4'-benzyloxy-2'-hydroxy-3'-methylacetophenone (Aldrich 29,884-0), 4,4'-bis(diethylamino) benzophenone (Aldrich 16,032-6), 5-chloro-2-hydroxy benzophenone (Aldrich C4,470-2), 4'-piperazinoacetophenone (Aldrich 13,646-8), 4'-piperidinoacetophenone (Aldrich 11,972-5), 2-amino-5-chlorobenzophenone (Aldrich A4,556-4), 3,6-bis(2-methyl-2-morpholinopropionyl)-9-octylcarbazole (Aldrich 46,073-7), and mixtures and combinations thereof. When present, the optional UV absorber may be present in the ink in any desired or effective amount, such as from about 1 percent to about 10 percent by weight of the ink or from about 3 percent to about 5 percent by weight of the ink.

The optional colorant can be the same or different from the optional colorant of the first ink and the optional colorant of the optional third ink. The optional additives of the first ink can be the same or different from the optional additives of the second and optional third ink. When present, the optional colorants and optional additives can be present in the same or different amounts in the first, second, and optional third inks. The optional third ink can optionally include a peroxide initiator, an amine activator, or can be a non-reactive material.

The amine activator can be present in equal molar amounts with the peroxide or optionally at higher or lower amounts with the peroxide. Higher amounts may increase the reaction time, although kinetic studies may indicate that the reactive is not very sensitive to amine concentration. In embodiments, lower amounts than equimolar are selected since the amine can be regenerated to react once again with a peroxide. Additionally, metal salts can be present in only catalytic amounts, since the metal salts can also react again with a peroxide.

In a specific embodiment, the first multi-functional monomer of the first ink is propoxylated neopentylglycol diacrylate, the second multi-functional monomer of the first ink is dipentaerythritol pentacrylate, and the peroxide initiator is benzoyl peroxide; and the first multi-functional monomer of the second ink is propoxylated neopentylglycol diacrylate, the second multi-functional monomer of the second ink is dipentaerythritol pentacrylate, and the amine activator is N,N-dimethyl-p-toluidine.

As the amine, tertiary amines are known to promote decomposition of peroxides to provide at least one reactive free radical species, allowing polymerization initiation at temperatures at which peroxides are normally inactive. Benzoyl peroxide by itself can have a half-life of about 62 minutes at about 90° C. Moreover, t-butyl hydroperoxide can have a half-life of about 1 hour at 200° C. As a result, a peroxide such as t-butyl hydroperoxide has a high half life to thermal initiation for the redox reaction. For example, t-butyl hydroperoxide can have a half-life of about 10 hours at 172° C. The thermal free-radical initiator (peroxide initiator of the first ink) can be thermally stable for a range of temperatures from about ambient temperature (about 25° C.) to about 90° C.

Additionally, a functionality of the peroxide decomposition agent, such as a compound with amine functionality, can be incorporated into an oligomer to provide a lower rate of diffusion for the peroxide decomposition agent. Thus, amine promotion can occur at a rate that substantially corresponds to the lower rate of diffusion of the amine activator. As a result, the redox initiation can occur at a range of temperatures from about ambient temperature to about 90° C.

While not wishing to be bound by theory, it is believed that the initiation reaction mechanism of a redox reaction for the amine-peroxide system to polymerize the multi-functional monomers of the first and second inks can be similar to that proposed originally by Homer in J. Polym Sci., 18, 438, 1955, and enlarged upon by Feng and Sun in Macromol. Chem., Macromol. Symp. 63, pp. 1-18 (1992). It is summarized in the scheme below where $R_1$ and $R_2$ represent the polymer chains into which the amine moiety is incorporated In embodiments, the amine can be 2-ethylhexyl-4-(dimethylamino)benzoate or the like. The t-butoxy free radical is expected to then react with the acrylic, methacrylic or other vinyl groups in the ink to form a hard, solid ink.

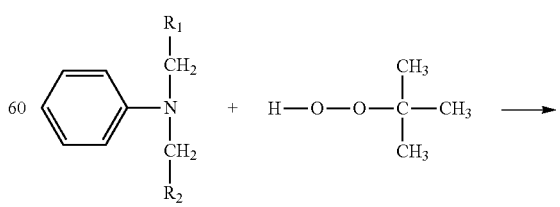

-continued

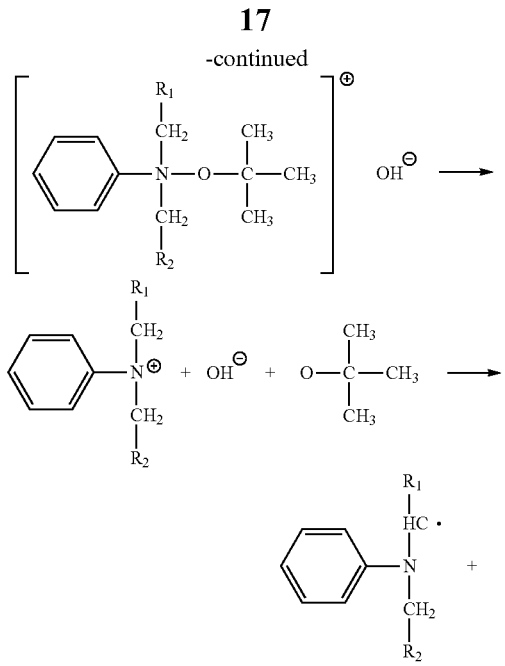

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Comparative Example 1

Benchmark oxidation-reduction initiated polymerization of triethylene glycol dimethacrylate. Triethyleneglycol dimethacrylate (TEGDMA), benzoyl-peroxide (BPO) and N,N-dimethyl-p-toluidine (DMT) were used as received from Sigma-Aldrich®. 0.04 grams (0.165 mMol) BPO was added to 2 grams (1.83 ml, 7 mMol) TEGDMA and shaken to make a BPO-TEGDMA 2 wt % BPO stock solution ([BPO]=90 mM). Separately, 18.3 μl (0.13 mMol) DMT) was added to 2 grams (1.83 ml, 7 mMol) TEGDMA and mixed to make a 1 vol % DMT stock solution ([DMT]=68.6 mM). A pre-weighed aluminum pan, suitable for use by a differential scanning calorimeter (TA Instruments Model 2690) was loaded with 7.2 μl of the BPO solution and 4.8 μl of the DMT solution. For confirmation and to assess sample loss, the total mixtures mass was measured (11.4 mg). A top pan was then crimped onto the pan containing the mixture and this resulting pan assembly placed on a pre-equilibrated differential scanning calorimetry (DSC) cell set to 37° C. A second empty pan assembly was placed into the DSC cell as a reference. To improve the stability of the signal, weight was added to the reference pan by crimping an extra lid onto it (mass of extra lid: 12.6 mg). The DSC cell was blanketed with a continuous $N_2$ purge to avoid sample oxidation. To ensure repeatability and accuracy of these kinetic experiments, the above preparatory loading and weighing steps were completed in 2 minutes.

The DSC cell was set to run isothermally at 37° C. and the reaction exotherm (W/g) recorded at this constant temperature as a function of time. The heat released (d(ΔH)/dt) was converted to the overall reaction rate (dx/dt) using equation 1 where $\Delta H_T$ is the total heat released at full conversion of the monomeric double bonds.

$$\frac{dx}{dt} = \frac{1}{\Delta H_T} \frac{d(\Delta H)}{dt} \qquad \text{(Equation 1)}$$

$\Delta H_T$ is calculated as the heat released through propagation of the methacrylate double bond ($\Delta H_0$=54.9 kJ/mol). Accounting for two double bonds per monomer molecule $\Delta H_T$ is therefore:

$$\Delta H_T = \left[\frac{2\Delta H_0}{MW_{monomer}}\right] \qquad \text{(Equation 2)}$$

The final pan weight was measured to be 11.3 mg indicating that practically no monomer had been lost.

Figure 2:
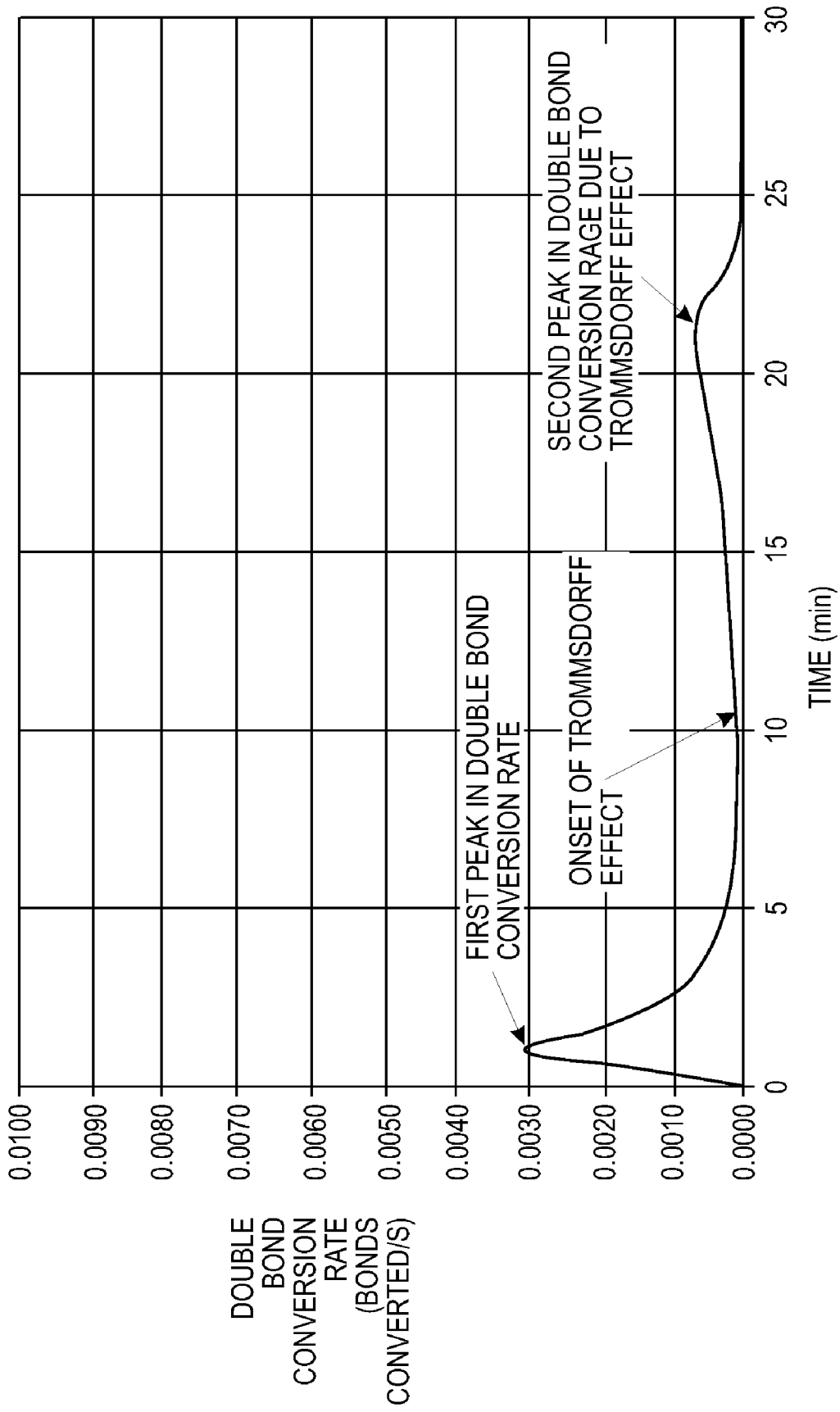
FIG. 2 is a graph illustrating double bond conversion rate for the ink set of Comparative Example 1.

The converted DSC data for this experiment is summarized in FIG. 1 showing double bond conversion (%, y axis) versus time (minutes, x axis) for the oxidation reduction initiated polymerization of triethylene glycol dimethacrylate measured by DSC. The initiator system is BPO catalyzed by DMT with reaction conditions: [BPO]:[DMT]=54 mM: 27 mM, bulk, 37° C. As can be observed from FIG. 1, high conversions (~40%) are achieved in approximately 8 minutes at which point the Trommsdorff effect sets in and the kinetics are once again accelerated so that final conversions of 73% are achieved in 24 minutes. This data thus shows two peaks in radical concentration versus time, polymerization rate versus time, and double bond conversion versus time as shown in FIG. 2. While the kinetics of this polymerization system are fast, they are not sufficiently so for reactive overcoat and ink applications. This example thus provides the state of the art benchmark kinetics against which our formulation can be judged.

Example 2

Acceleration of reaction kinetics through the use of a multi-functional and jettable monomer formulation. Propoxylated neopentylglycol diacrylate (PNPGDA), dipentaerythritol pentacrylate (DPEPA), BPO, and DMT were were used as received from Sigma-Aldrich®. A monomer stock solution having 90 wt % PNPGDA and 10 wt % DPEPA was prepared by mixing the two monomers in a beaker. To 2 grams (1.95 ml, 5.8 mMol) of this stock solution BPO (0.04 g, 0.165 mMol) was added and shaken to yield a 2 wt % BPO solution ([BPO]=85 mM). Separately DMT (19.5 μl, 0.135 mMol) was added to 2 grams (1.954 ml, 5.8 mMol) of stock solution and mixed to make a 1 vol % DMT stock solution ([DMT]=69 mM). A pre-weighed aluminum pan, suitable for use by a differential scanning calorimeter (TA Instruments Model 2690) was loaded with 5.5 μl of the BPO solution and 4.5 μl of the DMT solution. For confirmation and to assess sample loss the total mixtures mass was measured (10.2 mg). A top pan was then crimped onto the pan containing the mixture and this resulting pan assembly placed on a pre-equilibrated DSC cell set to 37° C. A second empty pan assembly was placed into the DSC cell as a reference. To improve the stability of the signal, weight was added to the reference pan by crimping an additional lid onto it (mass of extra lid 12.6 mg). The DSC cell was blanketed with a continuous $N_2$ purge to avoid sample oxidation. To ensure repeatability and accuracy of these kinetic experiments, the above preparatory loading and weighing steps were completed in 1.39 minutes. The DSC experiment was run and analyzed as in section 3.1. The final sample weight was measured to be 10.4 mg indicating that no weight had been lost from the sample.

Figure 3:
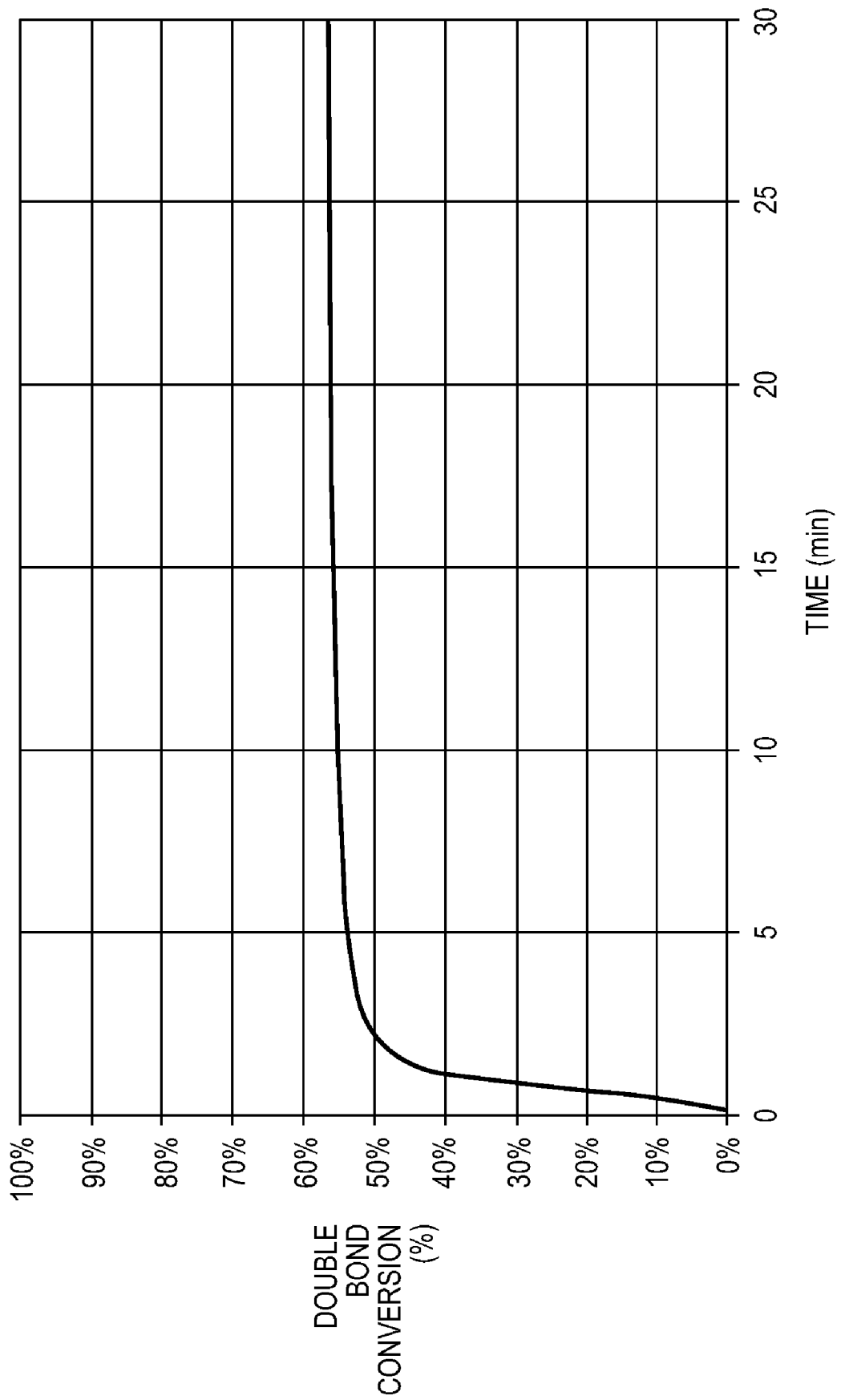
FIG. 3 is a graph showing double bond conversion versus reaction time for Example 2 as measured by differential scanning calorimetry.
Figure 4:
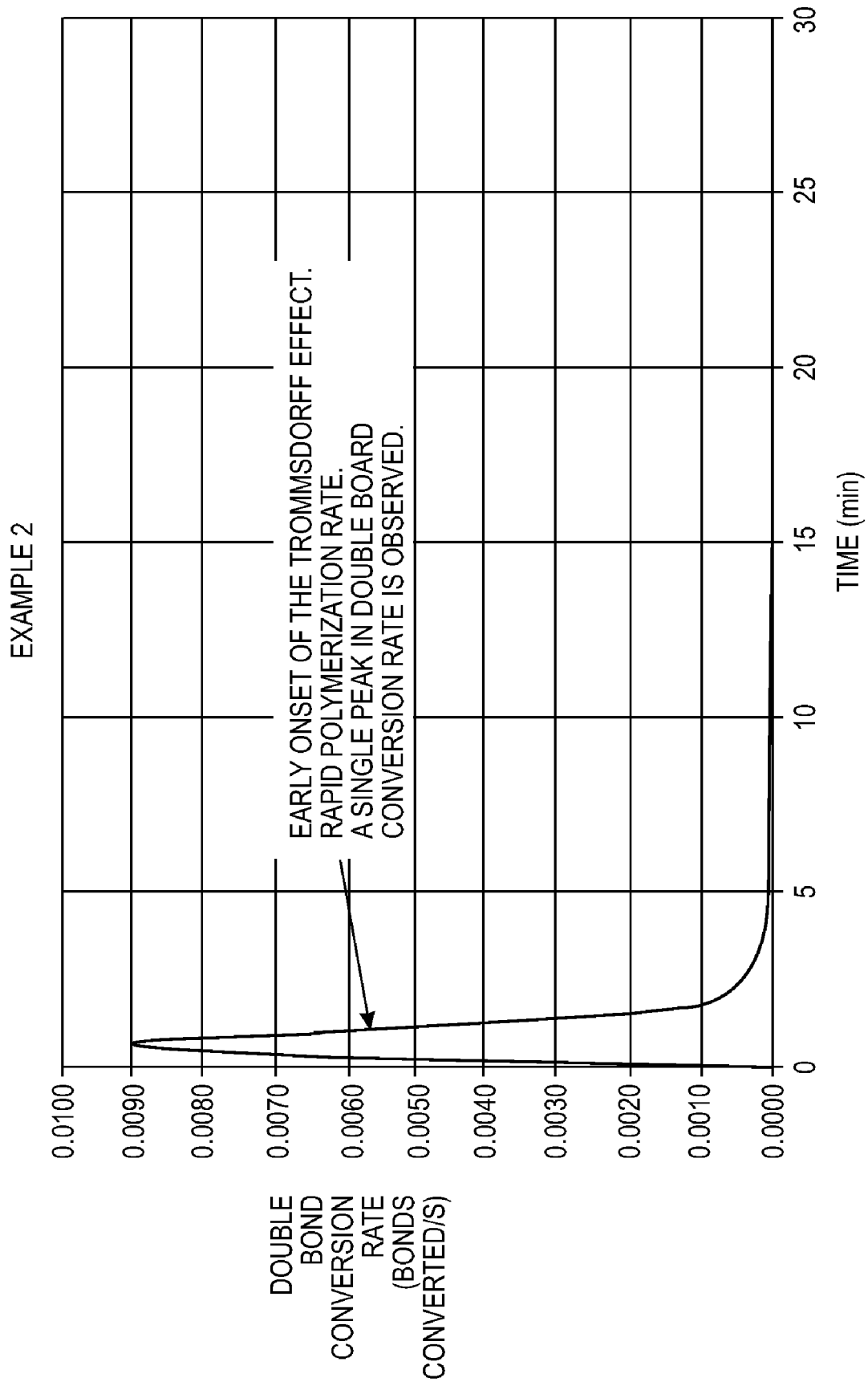
FIG. 4 is a graph illustrating reaction kinetics for the ink set of Example 2 and in accordance with the present disclosure.

FIG. 3 summarizes the experimental results for double bond conversion versus reaction time for the oxidation reduction initiated polymerization of propoxylated neopentylglycol diacrylate (90 wt %) and dipentaerythritol pentaacrylate (10 wt %) measured by DSC. The initiator system was BPO catalyzed by DMT with reaction conditions: [BPO]:[DMT] =47 mM: 31 mM, bulk, 37° C. As can be seen in FIG. 2, the formulation results in a significant acceleration of the reaction kinetics. Double bond conversions of 50% are achieved in 2 minutes at 37° C. The true kinetics are faster than those reported by the DSC as the preparatory time now is commensurate with the reaction time. Therefore only a fraction of the reaction is observed once the pan is placed on the DSC cell. The experiment is now too fast to allow practical observation by DSC. Nevertheless, this example demonstrates that the reaction rate (dx/dt) has been increased five-fold over the state of the art benchmark example provided in Comparative Example 1 (Ex. 1 dx/dt=38%/1 minute vs. Ex. 2 dx/dt=7.9%/1 minute). In this example the onset of monomer conversion and the gel or Trommsdorff effect coincide to give a single radical peak versus time, peak rate of polymerization versus time, and peak double bond conversion versus time as shown in FIG. 4. An alternate method to assess the true kinetics of this system is summarized in the next example.

Example 3

Acceleration of reaction kinetics through the use of the multifunctional and jettable monomer formulation of Example 2—Poke Test Results. BPO and DMT containing solutions were prepared as outlined in Example 1. One drop of the BPO solution was placed in a DSC pan at room temperature and a second drop of DMT added and mixed (time zero). A pipette was used to poke the mixture until it had solidified and the time of this occurrence recorded. The sample solidified in 1.28 minutes in an open pan in contact with the ambient atmosphere at room temperature.

Example 4

Acceleration of reaction kinetics through the use of a multifunctional and jettable monomer formulation and higher initiator loadings. PNPGDA, DPEPA, BPO, and DMT were used as received from Sigma-Aldrich®. A monomer stock solution 90 wt % PNPGDA and 10 wt % DPEPA was prepared by mixing the two monomers in a beaker. To 1 gram (0.98 ml, 2.9 mMol) of this stock solution, BPO (0.032 gram, 0.13 mMol) was added and shaken to yield a 3.2 wt % BPO solution ([BPO]=135 mM). Separately DMT (41 µl, 0.28 mMol) was added to 1 gram (0.98 ml, 2.9 mMol) of stock and mixed to make a 4 vol % DMT stock solution ([DMT]=290 mM). A pre-weighed aluminum pan, suitable for use by a differential scanning calorimeter (TA Instruments Model 2690) was loaded with 7.6 µl of the BPO solution and 2.4 µl of the DMT solution. For confirmation and to assess sample loss the total mixtures mass was measured (10.0 mg). The DSC experiment then proceeded as outlined in Comparative Example 1 at 37° C. The preparatory loading and weighing steps were completed in 1.43 minutes. The DSC experiment was run and analyzed as for Comparative Example 1. The final sample weight was measured to be 10.1 mg indicating that no weight had been lost from the sample.

Figure 5:
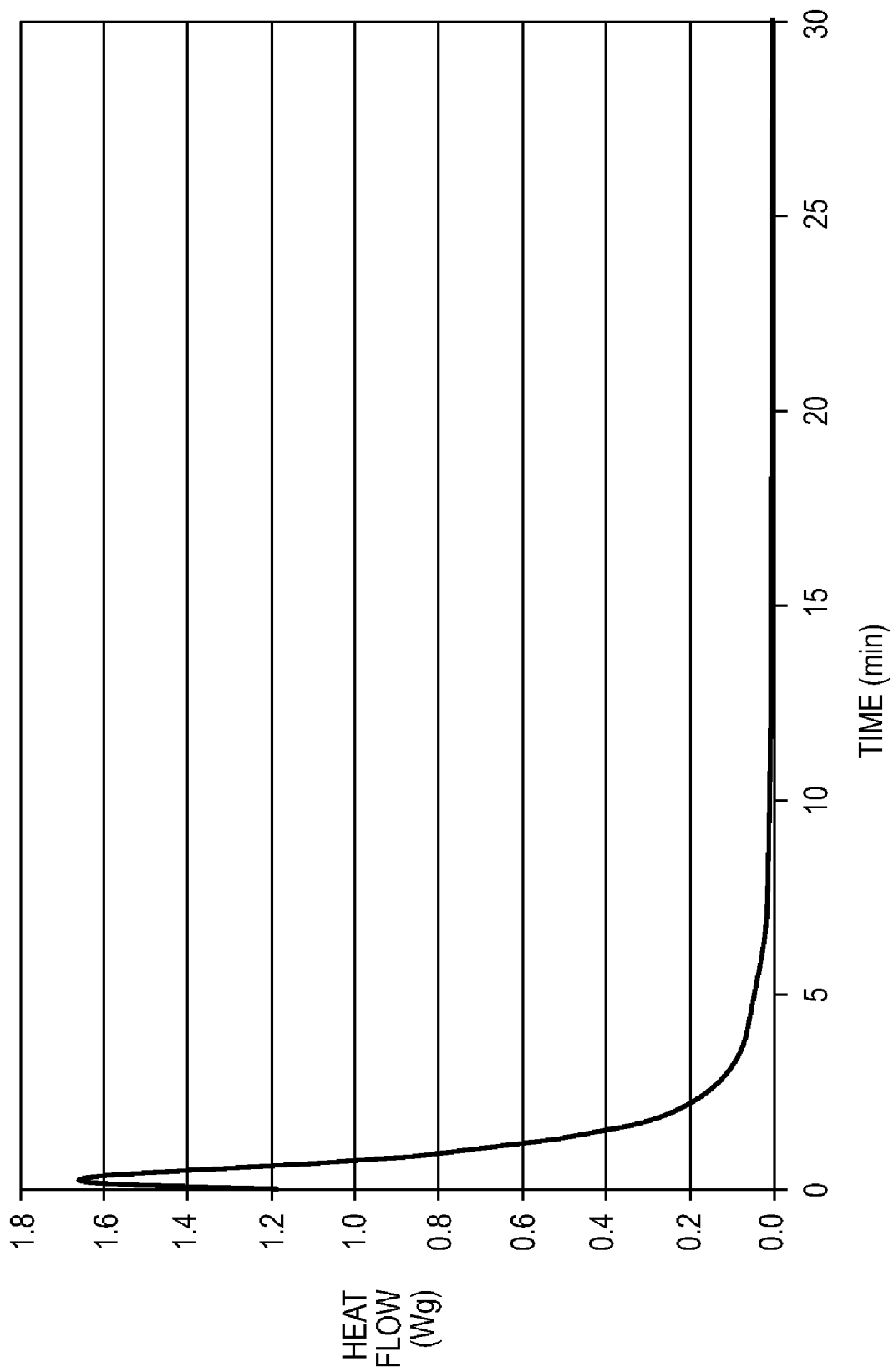
FIG. 5 is a graph showing heat flow versus reaction time for Example 4 as measured by differential scanning calorimetry.
Figure 6:
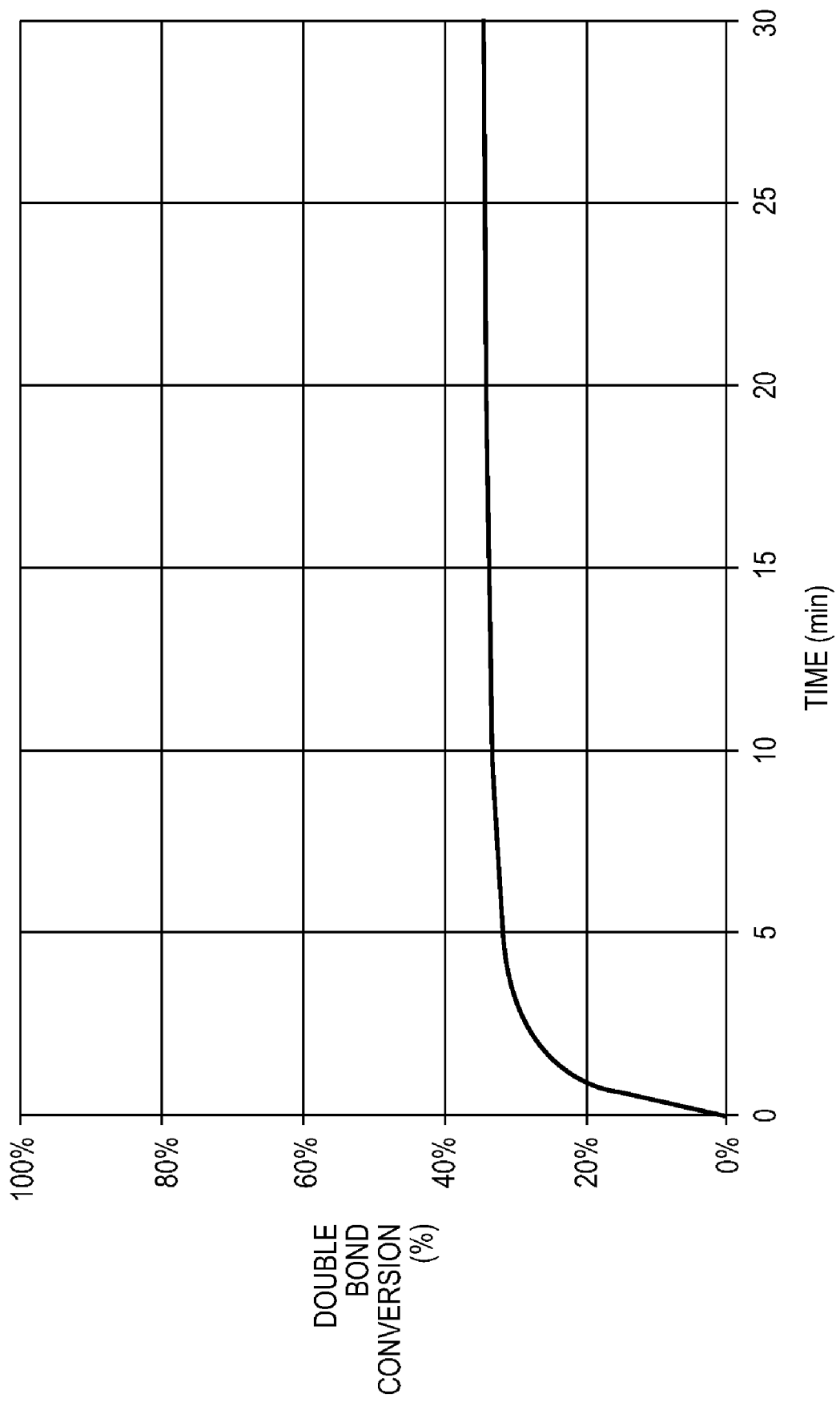
FIG. 6 is a graph showing double bond conversion versus reaction time for Example 4 poke test results as measured by differential scanning calorimetry.

FIG. 5 shows the raw DSC heat flow data and FIG. 6 shows the corresponding calculated double bond conversion data. FIG. 5 shows heat flow versus reaction time for the oxidation reduction initiated polymerization of PNPGDA (90 wt %) and DPEPA (10 wt %) measured by DSC having an initiator system of BPO catalyzed by DMT with reaction conditions: [BPO]:[DMT]=103 mM: 67 mM, bulk, 37° C. FIG. 6 shows double bond conversion versus reaction time for the oxidation reduction initiated polymerization of PNPGDA (90 wt %) and DPEPA (10 wt %) measured by DSC. As can be noted the formulation results in a further acceleration of the reaction kinetics over Example 2. In this case the raw heat flow data shows that the procedure was insufficiently fast to capture the entire reaction exotherm. This accounts in part for the artificially low final conversions as is also the case in Example 2. For the same reason, a true comparison of reaction kinetics can no longer be based on the DSC output but rather must rely on the poke test (Example 5).

Example 5

Acceleration of reaction kinetics through the use of a multifunctional and jettable monomer formulation and higher initiator loadings. BPO and DMT containing solutions were prepared as outlined in Example 4. One drop of the BPO solution was placed in a DSC pan at room temperature and a second drop of DMT added and mixed (time zero). A pipette was used to poke the mixture until it had solidified and the time of this occurrence recorded. The sample solidified in 18 seconds in an open pan in contact with the ambient atmosphere at room temperature.

FIGS. 2 and 4 illustrate the differences in reaction kinetics between Comparative Example 1 and Example 2. From FIGS. 2 and 4, it can be seen that double bond conversion rate, and therefore radical concentration, has a single peak for Example 2 in accordance with the present disclosure.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. An ink set comprising at least two inks;
   wherein a first ink includes an optional colorant, a first multi-functional monomer, a second multi-functional monomer that is different from the first multi-functional monomer, and a peroxide initiator comprising a thermal free radical initiator;
   wherein a second ink includes an optional colorant, a first multi-functional monomer, a second multi-functional monomer that is different from the first multi-functional monomer, and an amine activator comprising a catalyst which catalyzes the homolytic cleavage of the thermal free-radical initiator at low temperatures to form radicals;
   wherein the first ink is free of the amine activator and the second ink is free of the peroxide initiator; and
   wherein each of the first multi-functional monomer and the second multi-functional monomer is a monomer that accelerates reaction kinetics through a Trommsdorff effect; and wherein the first multi-functional monomer, the second multi-functional monomer, the peroxide initiator, and the amine activator are each present in an amount relative to the other that provides a) early onset of gelation that accelerates polymerization, and b) an ink viscosity that is suitable for jetting from an ink jet printer.

2. The ink set according to claim 1, wherein early onset of gelation is defined as reaction kinetics that have a single peak in the polymerization rate as a function of time for the production of a solid material from liquid monomer inks.

3. The ink set according to claim 1, wherein the at least one multi-functional monomer is a multi-vinyl monomer having from at least 2 to about 5 vinyl moieties.

4. The ink set according to claim 1, wherein the first multi-functional monomer and the second multi-functional monomer are each independently selected from the group consisting of pentaerythritol tetraacrylate, pentaerythritol tetramethacrylate, 1,2-ethylene glycol diacrylate, 1,2-ethylene glycol dimethacrylate, 1,6-hexanediol diacrylate, 1,6-hexanediol dimethacrylate, 1,12-dodecanol diacrylate, 1,12-dodecanol dimethacrylate, tris(2-hydroxy ethyl)isocyanurate triacrylate, propoxylated neopentyl glycol diacrylate, hexanediol diacrylate, tripropylene glycol diacrylate, dipropylene glycol diacrylate, ethoxylated bisphenol A diacrylate, ethoxylated bisphenol A dimethacrylate, alkoxylated hexanediol diacrylate, alkoxylated cyclohexane dimethanol diacrylate, polyethylene glycol diacrylate, polyethylene glycol dimethacrylate, tris(2-hydroxy ethyl)isocyanurate triacrylate, trifunctional acrylate ester, amine modified polyether acrylate, trimethylolpropane triacrylate, glycerol propoxylate triacrylate, dipentaerythritol pentaacrylate, dipentaerythritol hexaacrylate, ethoxylated pentaerythritol tetraacrylate, and mixtures and combinations thereof.

5. The ink set according to claim 1, wherein the first multi-functional monomer is present in the first ink in an amount of from about 85 to about 95 percent, wherein the second multi-functional monomer is present in the first ink in an amount of from about 15 to about 5 percent, wherein the peroxide initiator is present in the first ink in an amount of from about 1 to about 5 percent, wherein percent is percent by weight based upon the total weight of the first ink; and
wherein the first multi-functional monomer is present in the second ink in an amount of from about 85 to about 95 percent, wherein the second multi-functional monomer is present in the second ink in an amount of from about 15 to about 5 percent, wherein the amine activator is present in the second ink in an amount of from about 1 to about 5 percent, wherein percent is percent by weight based upon the total weight of the second ink.

6. The ink set according to claim 1, wherein the peroxide initiator is a peroxide selected from the group consisting of t-butyl hydroperoxide, 2,5-dihydroperoxy-2,5-dimethylhexane, cumene hydroperoxide, t-amyl hydroperoxide, dicumyl peroxide, benzoyl peroxide, 2,5-dimethyl-2,5-di(t-butylperoxy)hexane, t-butyl-α-cumyl peroxide, α-α-bis(t-butylperoxy)diisopropyl benzene, di-t-butyl peroxide, t-amyl peroxide, 2,5-dimethyl-2,5-di(t-butylperoxy)hexyne-3, peroxyesters, t-amylperoxyacetate, t-butylperoxybenzoate, t-amylperoxybenzoate, t-butylperoxyacetate, 00-t-butyl-0-(2-ethylhexyl)monoperoxycarbonate, 00-t-amyl-0-(2-ethyl hexyl)monoperoxycarbonate, 00-t-butyl-0-isopropylmonoperoxycarbonate, 2,2-di(t-amylperoxy)propane, n-butyl-4,4-bis(t-butylperoxy)valerate, 1,1-di(t-butylperoxy)-3,3,5-trimethylcyclohexane, 1,1-di(t-butyl)peroxycyclohexane, 1,1-di(t-amylperoxy)cyclohexane, 2,2-di(t-butylperoxy)butane, ethyl 3,3-di(t-butylperoxy)butyrate ethyl 3,3-di(t-amylperoxy)butyrate, and mixtures and combinations thereof.

7. The ink set according to claim 1, wherein the amine activator is a compound with amine functionality that is selected from the group consisting of copoly[(4,4'-isopropylidenebisphenyl bispropanol bisether) N-phenyldiethanolamine/fumaric acid], copoly[(4,4'-isopropylidenebisphenyl bispropanol bisether) 2,6-dimethanol pyridine/adipic acid], dimethylaminoethyl methacrylate, 2-hydroxy-3-dimethylaminopropyl methacrylate, 2-hydroxy-3-diethylaminopropyl methacrylate, N-acryl-N'-methylpiperazine, N-methacrylyl-N'-methylpiperazine, N—(N'-methylene-morpholino)acrylamide, N—(N'-methylene-morpholino)methacrylamide, N—(N',N'-dimethylaminophenyl)acrylamide, N—(N∝-methylene-morpholino)methacrylamide, N—(N',N'-dimethylaminophenyl)methacrylamide, 4-dimethylaminobenzylmethacrylate, N,N-dimethyl-p-toluidine, N,N-di(methacryloloxy-1,2-propyl)-p-toluidine, N-methacryloyloxy-1,2-ethyl-N-methyl aniline, and mixtures and combinations thereof.

8. The ink set according to claim 1, wherein the first multi-functional monomer of the first ink is propoxylated neopentylglycol diacrylate and the second multi-functional monomer of the first ink is dipentaerythritol pentacrylate;
wherein the first multi-functional monomer of the second ink is propoxylated neopentylglycol diacrylate and the second multi-functional monomer of the second ink is dipentaerythritol pentacrylate;
wherein the peroxide initiator is benzoyl peroxide; and
wherein the amine activator is N,N-dimethyl-p-toluidine.

9. The ink set according to claim 1, wherein the ink set provides substantially complete polymerization of the first and second multi-functional monomers in from about 0.1 to about 60 seconds after combination of the first ink and the second ink.

10. The ink set according to claim 1, further comprising:
a third ink that does not include the peroxide initiator or the amine activator.

11. A method of forming an image with an ink set comprising at least two inks, wherein a first ink includes an optional colorant, a first multi-functional monomer, a second multi-functional monomer that is different from the first multi-functional monomer, and a peroxide initiator comprising a thermal free radical initiator;
wherein a second ink includes an optional colorant, a first multi-functional monomer, a second multi-functional monomer that is different from the first multi-functional monomer, and an amine activator comprising a catalyst which catalyzes the homolytic cleavage of the thermal free-radical initiator at low temperatures into radicals;
wherein the first ink is free of the amine activator and the second ink is free of the peroxide initiator; and
wherein each of the first multi-functional monomer and the second multi-functional monomer is a monomer that accelerates reaction kinetics through a Trommsdorff effect; and
wherein the first multi-functional monomer, the second multi-functional monomer, the peroxide initiator, and the amine activator are each present in an amount relative to the other that provides a) early onset of gelation that accelerates polymerization, and b) an ink viscosity that is suitable for jetting from an ink jet printer, the method comprising:
providing the ink set to an ink jet device with an ink jet print head;
mixing the first and second inks before jetting, mixing the first and second inks during jetting, or mixing the first and second inks after jetting;

jetting the first and second inks with the ink jet print head onto a substrate or onto an intermediate transfer member;

wherein, when the first and second inks mix, the peroxide initiator and the amine activator initiate a reaction of the first and second multi-functional monomers of the first and second ink to form a hard, solid image.

12. The method according to claim 11, wherein the hard, solid image is an ink image, a colored ink image, an overcoat, or an undercoat.

13. The method according to claim 11, wherein the first multi-functional monomer and the second multi-functional monomer are each independently selected from the group consisting of pentaerythritol tetraacrylate, pentaerythritol tetramethacrylate, 1,2-ethylene glycol diacrylate, 1,2-ethylene glycol dimethacrylate, 1,6-hexanediol diacrylate, 1,6-hexanediol dimethacrylate, 1,12-dodecanol diacrylate, 1,12-dodecanol dimethacrylate, tris(2-hydroxy ethyl)isocyanurate triacrylate, propoxylated neopentyl glycol diacrylate, hexanediol diacrylate, tripropylene glycol diacrylate, dipropylene glycol diacrylate, ethoxylated bisphenol A diacrylate, ethoxylated bisphenol A dimethacrylate, alkoxylated hexanediol diacrylate, alkoxylated cyclohexane dimethanol diacrylate, polyethylene glycol diacrylate, polyethylene glycol dimethacrylate, tris(2-hydroxy ethyl)isocyanurate triacrylate, trifunctional acrylate ester, amine modified polyether acrylate, trimethylolpropane triacrylate, glycerol propoxylate triacrylate, dipentaerythritol pentaacrylate, dipentaerythritol hexaacrylate, ethoxylated pentaerythritol tetraacrylate, and mixtures and combinations thereof.

14. The method according to claim 11, wherein the first multi-functional monomer of the first ink is propoxylated neopentylglycol diacrylate, the second multi-functional monomer of the first ink is dipentaerythritol pentacrylate, and the peroxide initiator is benzoyl peroxide; and wherein the first multi-functional monomer of the second ink is propoxylated neopentylglycol diacrylate, the second multi-functional monomer of the second ink is dipentaerythritol pentacrylate, the amine activator is N,N-dimethyl-p-toluidine.

15. The method according to claim 11, wherein the ink set provides substantially complete polymerization of the first and second multi-functional monomers in from about 0.1 to about 60 seconds after combination of the first ink and the second ink.

16. A method of forming an article with an ink set comprising at least two inks, wherein a first ink includes an optional colorant, a first multi-functional monomer, a second multi-functional monomer that is different from the first multi-functional monomer, and a peroxide initiator comprising a thermal free radical initiator;

wherein a second ink includes an optional colorant, a first multi-functional monomer, a second multi-functional monomer that is different from the first multi- functional monomer, and an amine activator comprising a catalyst which catalyzes the homolytic cleavage of the thermal free-radical initiator at low temperatures into radicals;

wherein the first ink is free of the amine activator and the second ink is free of the peroxide initiator; and wherein each of the first multi-functional monomer and the second multifunctional monomer is a monomer that accelerates reaction kinetics through a Trommsdorff effect; and wherein the first multi-functional monomer, the second multi-functional monomer, the peroxide initiator, and the amine activator are each present in an amount relative to the other that provides a) early onset of gelation that accelerates polymerization, and b) an ink viscosity that is suitable for jetting from an ink jet printer, the method comprising:

providing the ink set to device having an orifice for ejecting the ink set;

mixing the first and second inks before ejecting, mixing the first and second inks during ejecting, or mixing the first and second inks after ejecting;

ejecting the first and second inks with the device into a mold;

wherein, when the first and second inks mix, the peroxide initiator and the amine activator initiate a reaction of the at least one multi-functional monomer of the first and second ink to form a hard, solid article.

17. The method according to claim 16, wherein the first multi-functional monomer and the second multi-functional monomer are each independently selected from the group consisting of pentaerythritol tetraacrylate, pentaerythritol tetramethacrylate, 1,2-ethylene glycol diacrylate, 1,2-ethylene glycol dimethacrylate, 1,6-hexanediol diacrylate, 1,6-hexanediol dimethacrylate, 1, 12-dodecanol diacrylate, 1,12-dodecanol dimethacrylate, tris(2-hydroxy ethyl) isocyanurate triacrylate, propoxylated neopentyl glycol diacrylate, hexanediol diacrylate, tripropylene glycol diacrylate, dipropylene glycol diacrylate, ethoxylated bisphenol A diacrylate, ethoxylated bisphenol A dimethacrylate, alkoxylated hexanediol diacrylate, alkoxylated cyclohexane dimethanol diacrylate, polyethylene glycol diacrylate, polyethylene glycol dimethacrylate, tris(2-hydroxy ethyl) isocyanurate triacrylate, trifunctional acrylate ester, amine modified polyether acrylate, trimethylolpropane triacrylate, glycerol propoxylate triacrylate, dipentaerythritol pentaacrylate, dipentaerythritol hexaacrylate, ethoxylated pentaerythritol tetraacrylate, and mixtures and combinations thereof.

18. The method according to claim 16, wherein the first multi-functional monomer of the first ink is propoxylated neopentylglycol diacrylate, the second multi-functional monomer of the first ink is dipentaerythritol pentacrylate, and the peroxide initiator is benzoyl peroxide; and wherein the first multi-functional monomer of the second ink is propoxylated neopentylglycol diacrylate, the second multi-functional monomer of the second ink is dipentaerythritol pentacrylate, the amine activator is N,N-dimethyl-ptoluidine.

19. The method according to claim 16, wherein the ink set provides substantially complete polymerization of the first and second multi-functional monomers in from about 0.1 to about 60 seconds after combination of the first ink and the second ink.

* * * * *